D. L. GROVER.
Butter-Paddles.
No. 138,800.                      Patented May 13, 1873.
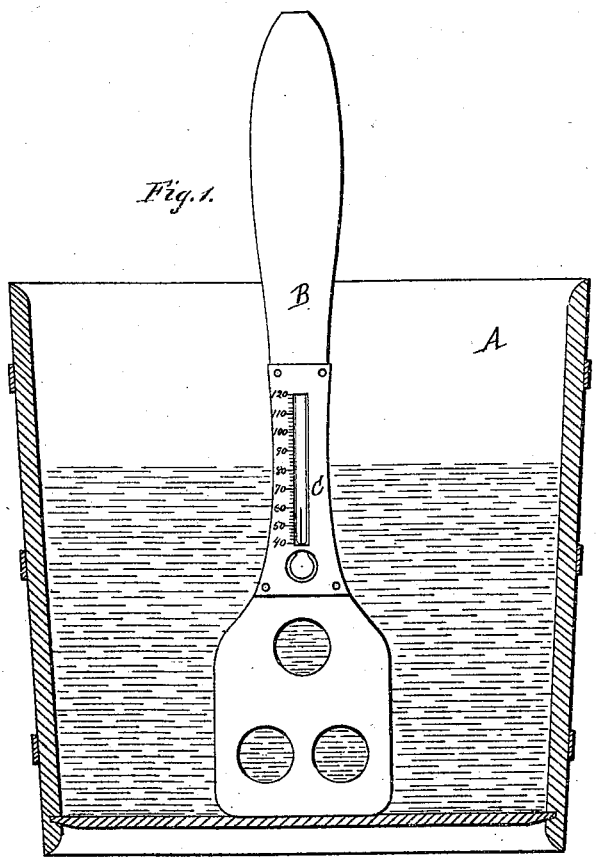
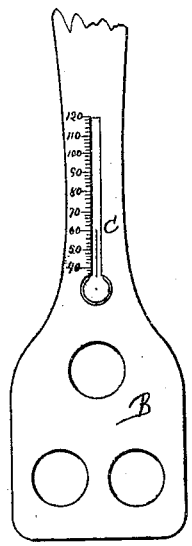
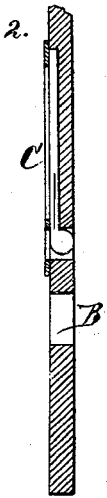

UNITED STATES PATENT OFFICE.

DEMAS L. GROVER, OF GROTON, NEW YORK.

IMPROVEMENT IN BUTTER-PADDLES.

Specification forming part of Letters Patent No. 138,800, dated May 13, 1873; application filed April 3, 1873.

*To all whom it may concern:*

Be it known that I, D. L. GROVER, of Groton, in the county of Tompkins and in the State of New York, have invented certain new and useful Improvements in Dairy-Ladle; and do hereby declare that the following is a full, clear, and exact description thereof, reference being had to the accompanying drawing and to the letters of reference marked thereon, making a part of this specification.

The nature of my invention consists in a dairy-paddle for stirring milk, cream, curd, &c., and provided with a thermometer for ascertaining the temperature of the material within which it is used.

In the annexed drawing, A represents an ordinary milk or cream jar or pail, constructed in any of the known and usual ways. B represents the handle of a ladle, for stirring or agitating the cream or milk. This handle is made of wood, and is provided with a recess or groove, in which is inserted a thermometer. The thermometer may be made in any of the usual ways; but I prefer to have the bulb turned to one side of the stem, as shown in Fig. 2, so that it rests securely within the recess in the handle without danger of being broken off or injured. The thermometer may be protected by having a metal plate sealed over it, the plate having a slot in it through which the mercury may be visible.

At the extremity of the handle a paddle is formed, and is provided with suitable perforations for the passage of milk, curd, or cheese.

In dairies it is necessary that the cream should be stirred every time a fresh quantity of cream is placed in the pail, and it is very necessary that the cream should be kept at a uniform temperature. With this implement the cream is agitated, and the operator by means of the thermometer can at all times readily tell the temperature.

The implement is equally applicable in cheese-making, and when not in use can be hung upon a rack in the milk-room. The hole in the handle, which contains the bulb of the thermometer, should be bored entirely through, so that the milk, cream, or cheese may be admitted at the back as well as the front side.

It will readily be perceived that a ladle thus constructed will be of great service in always quickly designating the temperature of the milk or cream for any purpose for which it may be used.

Having thus fully described my invention, what I claim is—

A paddle for stirring milk, cream, or curd, provided with a thermometer, as and for the purposes set forth.

In testimony that I claim the foregoing I have hereunto set my hand this 20th day of March, 1873.

DEMAS L. GROVER.

Witnesses:
C. L. EVERT,
H. K. CLARK.